United States Patent [19]

Ando et al.

[11] Patent Number: 4,725,034
[45] Date of Patent: Feb. 16, 1988

[54] FORMING MOLD APPARATUS

[75] Inventors: Yoshio Ando; Kouichi Odaka, both of Kawagoe; Akihiko Koshiro, Houya; Toshiyuki Kinugasa, Hidaka, all of Japan

[73] Assignee: Honda Giken Kogyo Kabushiki Kaisha, Tokyo, Japan

[21] Appl. No.: 783,507

[22] Filed: Oct. 3, 1985

[51] Int. Cl.⁴ .............................................. B29C 33/04
[52] U.S. Cl. ..................................... 249/80; 249/116; 249/135
[58] Field of Search ..................... 249/79, 80, 81, 116, 249/135, 137; 425/547, 552, 435

[56] References Cited

U.S. PATENT DOCUMENTS

| | | | |
|---|---|---|---|
| 2,428,660 | 10/1947 | Falk et al. | 249/79 |
| 2,579,898 | 12/1951 | Brucker | 249/80 |
| 3,173,175 | 3/1965 | Lemelson | 249/79 |
| 3,228,071 | 1/1966 | Schultz | 249/79 |
| 3,880,227 | 4/1975 | Bauer | 249/79 |
| 4,063,705 | 12/1977 | Vodra | 249/80 |
| 4,105,184 | 8/1978 | Sumitomo | 249/79 |
| 4,141,531 | 2/1979 | Strausfeld | 249/80 |
| 4,552,715 | 11/1985 | Ando et al. | 264/309 |

FOREIGN PATENT DOCUMENTS 2159231  6/1973  France ................................. 249/79

Primary Examiner—Jay H. Woo
Assistant Examiner—James C. Housel
Attorney, Agent, or Firm—Armstrong, Nikaido, Marmelstein & Kubovcik

[57] ABSTRACT

A forming mold main body made of a first platelike member defining a forming mold surface of a predetermined shape and a second platelike member joined airtightly at least at circumferential portions to the first member to define therebetween a jacket for heating or cooling medium. Plural spacers can be disposed between the two platelike members.

4 Claims, 4 Drawing Figures

FORMING MOLD APPARATUS

BACKGROUND OF THE INVENTION

This invention relates to a forming mold apparatus used chiefly for manufacturing a molded skin member made of a synthetic material.

The applicants of this application have previously proposed an apparatus, as disclosed in U.S. Pat. No. 4,552,715, in which a forming mold main body is provided on its front surface with a forming mold surface of a predetermined shape and on its rear surface with a space for a jacket extending over almost the whole surface thereof. The apparatus is arranged so that a thermal medium such as oil or the like may be introduced into the jacket and the mold surface may be heated and cooled at will by changing over the thermal medium introduced between a heating one and a cooling one. It has been usual with this type of apparatus that the forming mold main body is formed out of a metallic mold block which is comparatively large in thickness. This type of apparatus, consequently, is inconvenient in that the same is comparatively so large in weight as to become troublesome in handling, and additionally is troublesome in working for forming the space for the jacket in the metallic mold.

OBJECT AND SUMMARY OF THE INVENTION

This invention has for its object to provide an apparatus of similar type which is lighter in weight and wherein the space for the jacket is more easily formed.

In an apparatus of the type that a forming mold main body is provided on its front surface with a forming mold surface of a predetermined shape and on its rear surface with a space for a jacket extending over almost the whole surface thereof, and is arranged so that a thermal medium such as oil or the like may be introduced into the jacket, the invention is characterized in that the forming mold main body is composed of a first platelike member on a front side for forming the forming mold surface and a second platelike member on a rear side. The two platelike members are put one upon another and are joined together air-tightly at least at their circumferential portions so that there is formed therein a space for the jacket between the joined members. The platelike members are connected together through plural spacers disposed distributively in the space.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
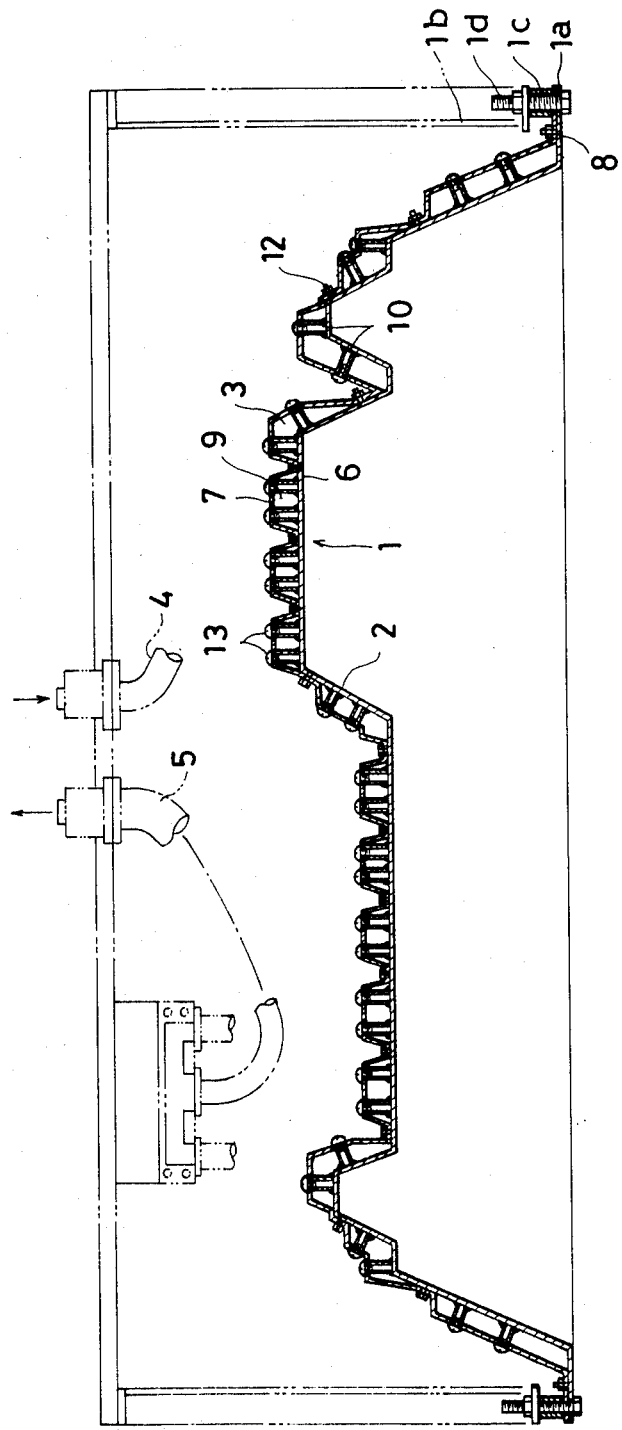
FIG. 1 is a sectional side view of one example of this invention.
Figure 2:
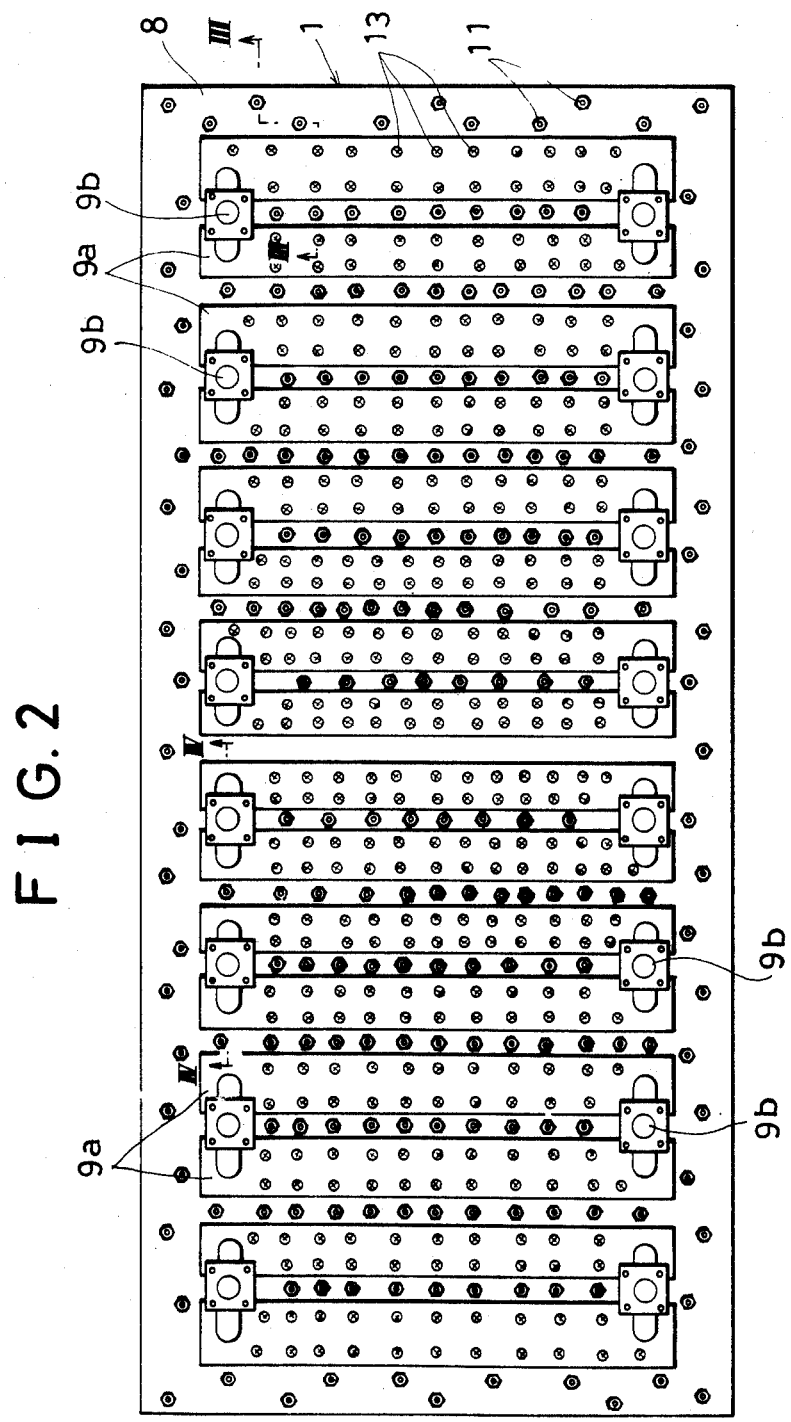
FIG. 2 is a top plan view thereof.

One embodying example of this invention will now be explained with reference to the accompanying drawings:

Referring to the drawings, a forming mold main body 1 has a forming mold surface 2 on its front surface, and a jacket 3 on its rear surface. The jacket 3 is brought into communication with a tank (not illustrated) through respective passages 4, 5 on its inlet side and on its outlet side so that there is formed a circulation passage for a thermal medium such as oil or the like between the jacket 3 and the tank. In this manner, the mold surface 2 may be heated and cooled at will by changing over the thermal medium introduced between a heating one of a high temperature and a cooling one of a low temperature.

The above construction is not basically different from that in the previously proposed one. According to this invention, however, the forming mold main body 1 is composed of a first platelike member 6 on a front side for forming the mold surface 2, and a second platelike member 7 on a rear side. The two members 6, 7 are put one upon another and joined together air-tightly at least at their circumferential portions 8 so that there is formed therebetween a space 9 for the jacket 3 between the joined members 6, 7. The two members 6, 7 are additionally connected together through plural spacers 10 disposed distributively in the space 9 so that those members 6, 7 may be reinforced therewith.

Figure 3:
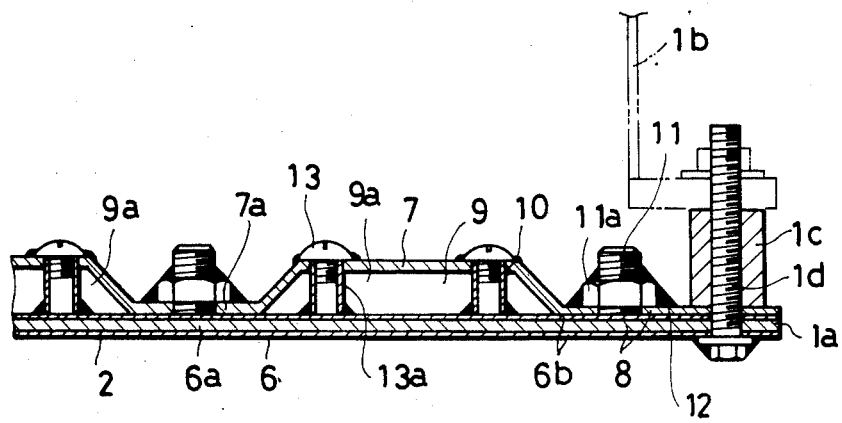
FIGS. 3 and 4 are enlarged sectional views taken along the lines III—III and IV—IV in FIG. 2.

More in detail, the first platelike member 6 is composed of three-layers as shown clearly in FIG. 3, for instance. For example, the member 6 can be constructed of a copper layer 6a of comparatively large thickness such as 2.0–2.5 mm applied on its front and rear surfaces with nickel plated layers 6b, 6b of comparatively small thickness such as 0.3–0.5 mm. The front surface thereof can be applied with a wrinkle pattern, a stitch pattern or the like as an occasion demands. The second platelike member 7 is made of SP (steel plate) material, copper material or the like, for instance. A means for putting those platelike members 6, 7 one upon another and joining them together at their circumferential portions is as shown on the right side in FIG. 3, for instance. Namely, the same is such that a stud 11 extending from the first platelike member 6 has a nut 11a tightened thereon and additionally has a soldering sealing 12 applied thereto. Additionally, a means for connecting them together through each of the spacers 10 is as shown on the left side in the FIG. 3, for instance. Namely, the same is such that a tubular nut 13a is fixed by stud-welding to the rear surface of the first platelike member 6 and is applied at its outer end with a machine screw 13.

Figure 4:
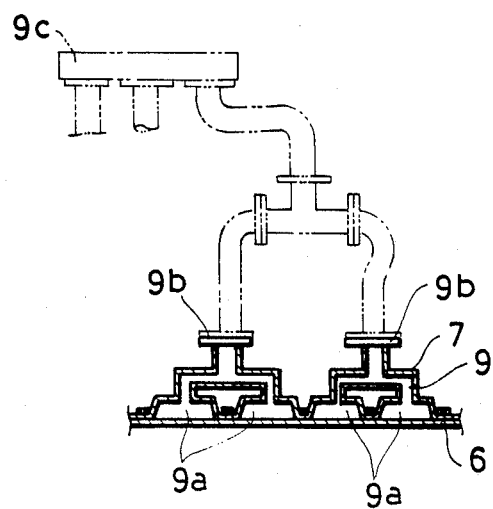

More in detail, in the illustrated example, the second plate-like member 7 is formed into one having plural ridges 7a at proper intervals which are in parallel with the right and left side edges of the circumferential portion thereof. The second plate-like member 7 is put on and joined air-tightly to the first plate-like member 6 also at flat top surfaces of those ridges 7a in almost the same manner as done at their circumferential portions 8. The air-tight joint condition thereof is as shown on the extreme left side in FIG. 3, for instance. Thus, the foregoing space 9 is formed into divided ones comprising plural flowing passages 9a formed between respective adjacent pair of the mutually parallel ridges 7a. Additionally, each adjacent pair of the flowing passages 9a, 9a are provided at both ends of each passage 9a with respective openings 9b, 9b and 9b, 9b for inlet and outlet. A pair of respective openings 9b, 9b at one end of each pair thereof are joined together for communication with the foregoing outlet side passage 5 through a manifold 9c as shown in FIG. 4, for instance. The respective openings 9b at the other end thereof are similarly joined together for communication with the foregoing inlet side passage 4.

The forming mold main body 1 composed of the foregoing two platelike members 6, 7 is used by attaching it at outer circumferential edge 1a thereof to a holding frame 1b located behind the same, as shown clearly in FIG. 1, for instance. The attached condition thereof is as shown clearly at the extreme right end in FIG. 3, for instance. Namely, the forming mold main body 1 and the frame 1b are fastened together through a collar 1c by means of a bolt and nut assembly 1d.

Thus, according to this invention, the forming mold main body is composed of the first platelike member on the front surface and the second platelike member on the rear surface, so that a forming mold apparatus results which is comparatively small in thickness and light in weight as a whole at a low price. Additionally, the two platelike members are put one upon another and joined together air-tightly at least at their circumferential portions thereof so that there is formed therein the space for the jacket between the joined members. With such structure, proper temperature control operation can be given at a high efficiency to the front forming mold surface by introducing a thermal medium into the space. Additionally, the two platelike members are connected together through spacers distributed in the space, so that those platelike members can be reinforced one with another. The entire apparatus may be thus increased in rigidity, and can be free from deformation during use thereof and is durable in use for a long time.

It is readily apparent that the above-described forming mold apparatus meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A forming mold apparatus comprising:
a forming mold main body provided on a front surface with a forming mold surface of a predetermined shape and on a rear surface with a jacket extending over almost the whole rear surface thereof forming a space between said main body and said jacket, said main body being so arranged that a thermal medium may be introduced into said space, said forming mold main body being composed of a first platelike member on a front side forming said forming mold surface and a second platelike member on a rear side forming said jacket; said second member being formed with a plurality of parallel ridges and a perimetral ridge having flat top surfaces, said second member being joined airtightly to said first member by a connecting means at each of said ridges for connecting said first and second members together, said space being formed into plural parallel flow passages defined by said first member and respective adjacent pairs of said parallel ridges of said second member, said plural parallel flow passages being provided with respective openings at each end thereof for inlet and outlet of said thermal medium; and the two platelike members are additionally connected together through plural spacers disposed distributively in said space, said plural spacers for reinforcing said first and second platelike members.

2. A forming mold apparatus as claimed in claim 1, wherein said first platelike member is composed of at least three layers.

3. A forming mold apparatus as claimed in claim 1, wherein said plural spacers each comprise a tubular nut extending from said first platelike member, said tubular nut fastening said second platelike member to said first platelike member with a machine screw.

4. A forming mold apparatus as claimed in claim 1, wherein said connecting means each comprise a stud extending from said first platelike member, a nut tightened on said stud, and a solder seal applied to said stud and said nut.

* * * * *